US007853895B2

(12) United States Patent
Tu

(10) Patent No.: US 7,853,895 B2
(45) Date of Patent: Dec. 14, 2010

(54) CONTROL OF BACKGROUND MEDIA WHEN FOREGROUND GRAPHICAL USER INTERFACE IS INVOKED

(75) Inventor: Edgar A. Tu, Castro Valley, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 680 days.

(21) Appl. No.: 10/874,922

(22) Filed: Jun. 22, 2004

(65) Prior Publication Data
US 2005/0257169 A1 Nov. 17, 2005

Related U.S. Application Data

(60) Provisional application No. 60/570,343, filed on May 11, 2004.

(51) Int. Cl.
*G06F 3/048* (2006.01)
*G06F 3/00* (2006.01)

(52) U.S. Cl. .................. 715/835; 715/716; 715/720; 715/765; 715/786; 715/810

(58) Field of Classification Search ........... 715/716, 715/965
See application file for complete search history.

(56) References Cited

U.S. PATENT DOCUMENTS

| 5,767,919 | A | * | 6/1998 | Lee et al. ................. 725/37 |
| 5,864,868 | A | * | 1/1999 | Contois ................ 707/104.1 |
| 5,956,025 | A | * | 9/1999 | Goulden et al. ............ 715/716 |
| 5,982,980 | A | * | 11/1999 | Tada ....................... 386/96 |
| 6,061,695 | A | * | 5/2000 | Slivka et al. .............. 715/513 |
| 6,084,169 | A | * | 7/2000 | Hasegawa et al. ........... 84/600 |
| 6,091,411 | A | * | 7/2000 | Straub et al. .............. 715/747 |
| 6,118,450 | A | * | 9/2000 | Proehl et al. .............. 715/810 |
| 6,121,967 | A | * | 9/2000 | Foster et al. .............. 715/772 |
| 6,182,094 | B1 | * | 1/2001 | Humpleman et al. ........ 715/513 |
| 6,370,550 | B1 | * | 4/2002 | Douma et al. ............ 715/500.1 |
| 6,395,969 | B1 | * | 5/2002 | Fuhrer .................... 84/477 R |
| 6,452,609 | B1 | * | 9/2002 | Katinsky et al. ............ 715/716 |
| 6,487,589 | B1 | * | 11/2002 | Yoshino et al. ............ 709/220 |

(Continued)

FOREIGN PATENT DOCUMENTS

JP 2002-287950 10/2002

(Continued)

OTHER PUBLICATIONS http://www.w3.org/TR/2001/REC-smil20-20010807/cover.html#minitoc.*

*Primary Examiner*—Steven B Theriault
(74) *Attorney, Agent, or Firm*—Frommer Lawrence & Haug LLP; William S. Frommer; Thomas F. Presson

(57) ABSTRACT

A contents display control system includes: a media type determination unit configured to determine a media type of selected media contents; a contents display parameter adjustment unit operating to generate at least one adjustment value for at least one display parameter of the selected media contents; and a contents display processor configured to control display of the selected media contents in the background when graphical user interface is present in the foreground, the contents display processor controlling the display by appropriately adjusting the at least one display parameter of the selected media contents with the at least one adjustment value for the determined media type.

36 Claims, 6 Drawing Sheets

U.S. PATENT DOCUMENTS

| | | | |
|---|---|---|---|
| 6,690,391 B1 | 2/2004 | Kim et al. | |
| 6,731,310 B2* | 5/2004 | Craycroft et al. | 715/765 |
| 6,731,312 B2* | 5/2004 | Robbin | 715/792 |
| 6,781,518 B1* | 8/2004 | Hayes et al. | 340/825.72 |
| 6,791,581 B2* | 9/2004 | Novak et al. | 715/744 |
| 6,904,566 B2* | 6/2005 | Feller et al. | 715/728 |
| 6,930,730 B2* | 8/2005 | Maxon et al. | 348/734 |
| 6,944,829 B2* | 9/2005 | Dando | 715/798 |
| 6,964,009 B2* | 11/2005 | Samaniego et al. | 715/202 |
| 6,977,335 B2* | 12/2005 | Georges et al. | 84/609 |
| 7,073,130 B2* | 7/2006 | Novak et al. | 715/744 |
| 7,076,734 B2* | 7/2006 | Wolff et al. | 715/720 |
| 7,093,198 B1* | 8/2006 | Paatero et al. | 715/746 |
| 7,136,870 B1* | 11/2006 | McGloughlin | 707/104.1 |
| 7,139,981 B2* | 11/2006 | Mayer et al. | 715/771 |
| 7,146,408 B1* | 12/2006 | Crater et al. | 709/219 |
| 7,155,305 B2* | 12/2006 | Hayes et al. | 700/224 |
| 7,188,315 B2* | 3/2007 | Chen et al. | 715/764 |
| 7,239,348 B2* | 7/2007 | Miyazaki | 348/231.4 |
| 7,257,775 B1* | 8/2007 | Jivakov et al. | 715/742 |
| 7,326,846 B2* | 2/2008 | Terada | 84/609 |
| 7,355,112 B2* | 4/2008 | Laakso | 84/615 |
| 2001/0047384 A1* | 11/2001 | Croy | 709/203 |
| 2002/0103817 A1* | 8/2002 | Novak et al. | 707/205 |
| 2003/0001907 A1 | 1/2003 | Bergsten et al. | |
| 2003/0009537 A1* | 1/2003 | Wang | 709/219 |
| 2003/0080995 A1* | 5/2003 | Tenenbaum et al. | 345/738 |
| 2003/0083940 A1* | 5/2003 | Kumar et al. | 705/14 |
| 2003/0090524 A1* | 5/2003 | Segerberg et al. | 345/786 |
| 2003/0095149 A1 | 5/2003 | Fredriksson et al. | |
| 2003/0169302 A1* | 9/2003 | Davidsson et al. | 345/810 |
| 2003/0182139 A1* | 9/2003 | Harris et al. | 705/1 |
| 2003/0236582 A1* | 12/2003 | Zamir et al. | 700/94 |
| 2003/0237043 A1* | 12/2003 | Novak et al. | 715/500.1 |
| 2004/0008229 A1* | 1/2004 | Hultcrantz | 345/810 |
| 2004/0068536 A1* | 4/2004 | Demers et al. | 709/201 |
| 2004/0078382 A1* | 4/2004 | Mercer et al. | 707/102 |
| 2004/0136570 A1* | 7/2004 | Ullman et al. | 382/114 |
| 2004/0140995 A1* | 7/2004 | Goldthwaite et al. | 345/716 |
| 2004/0155901 A1* | 8/2004 | McKee et al. | 345/747 |
| 2004/0201610 A1* | 10/2004 | Rosen et al. | 345/731 |
| 2004/0205091 A1* | 10/2004 | Mulcahy et al. | 707/204 |
| 2004/0210825 A1* | 10/2004 | Novak et al. | 715/500.1 |
| 2004/0216054 A1* | 10/2004 | Mathews et al. | 715/765 |
| 2004/0220791 A1* | 11/2004 | Lamkin et al. | 703/11 |
| 2005/0039128 A1* | 2/2005 | Hsu et al. | 715/728 |
| 2005/0102324 A1* | 5/2005 | Spring et al. | 707/104.1 |
| 2005/0102626 A1* | 5/2005 | Novak et al. | 715/744 |
| 2005/0102627 A1* | 5/2005 | Novak et al. | 715/744 |
| 2005/0114784 A1* | 5/2005 | Spring et al. | 715/762 |
| 2005/0187943 A1* | 8/2005 | Finke-Anlauff et al. | 707/100 |
| 2005/0188310 A1* | 8/2005 | Dideriksen et al. | 715/728 |
| 2005/0210051 A1* | 9/2005 | Novak et al. | 707/100 |
| 2005/0210398 A1* | 9/2005 | Novak et al. | 715/765 |
| 2005/0262449 A1* | 11/2005 | Anderson et al. | 715/779 |
| 2005/0281470 A1* | 12/2005 | Adams | 382/232 |
| 2006/0053384 A1* | 3/2006 | La Fetra et al. | 715/765 |
| 2006/0123058 A1* | 6/2006 | Mercer et al. | 707/104.1 |
| 2007/0011279 A1* | 1/2007 | Haklai | 709/219 |

FOREIGN PATENT DOCUMENTS

| | | |
|---|---|---|
| JP | 2002-543487 | 12/2002 |
| WO | WO 00/65429 | 11/2000 |
| WO | WO 03/003180 | 1/2003 |
| WO | WO 03/021916 | 3/2003 |

* cited by examiner

US 7,853,895 B2

CONTROL OF BACKGROUND MEDIA WHEN FOREGROUND GRAPHICAL USER INTERFACE IS INVOKED

CROSS-REFERENCE TO RELATED APPLICATIONS

This application claims the benefit of priority of U.S. Provisional Patent Application Ser. No. 60/570,343, entitled "Control of Background Media when Foreground Graphical User Interface is Invoked", filed May 11, 2004. Benefit of priority of the filing date of May 11, 2004 is hereby claimed, and the disclosure of the Provisional Patent Application is hereby incorporated by reference.

BACKGROUND

Graphical user interfaces simplify user interaction with computer programs and are designed such that knowledge of specific commands and/or combinations of keystrokes is not required to efficiently and effectively use the computer program. Thus, a function can be carried out by the computer application, which owns the graphical user interface (GUI), by selecting or clicking with a mouse a particular selection available in a GUI.

In a typical window-based GUI system, a group of visually distinct display objects are provided on the display to form a menu screen. The display objects are commonly referred to as "icons". Each of the icons represents a function or object, and may be configured as a pointer or symbol connecting the function or object to a file or contents. Presenting the file or contents to a user with a computer using multiple windows on a display device with a GUI is known in the art. The technique of using a pointing device, such as a mouse or a trackball to select data within the file before a function is applied to the data is also known in the art. Further, the method of using the pointing device to provide graphical input to the window is also well known.

However, these techniques present various difficulties when the GUI menu screen is invoked while the selected medium is playing or executing on the display. Further, the difficulties may vary according to the type of selected media.

SUMMARY

The present invention includes systems and methods that provide control of multimedia contents displayed in the background when the foreground graphical user interface (GUI) is invoked. In one implementation, a contents display control system includes: a media type determination unit configured to determine a media type of selected media contents; a contents display parameter adjustment unit operating to generate at least one adjustment value for at least one display parameter of the selected media contents; and a contents display processor configured to control display of the selected media contents in the background when graphical user interface is present in the foreground, the contents display processor controlling the display by appropriately adjusting the at least one display parameter of the selected media contents with the at least one adjustment value for the determined media type.

In another implementation, a contents display control method includes: determining a media type of selected media contents; generating at least one adjustment value for at least one display parameter of the selected media contents; and controlling display of the selected media contents in the background when graphical user interface is present in the foreground, by appropriately adjusting the at least one display parameter of the selected media contents with the at least one adjustment value for the determined media type.

In another implementation, a computer program, stored in a tangible storage medium, for use in controlling contents display includes executable instructions that cause a computer to: determine a media type of selected media contents; generate at least one adjustment value for at least one display parameter of the selected media contents; and control display of the selected media contents in the background when graphical user interface is present in the foreground, by appropriately adjusting the at least one display parameter of the selected media contents with the at least one adjustment value for the determined media type.

In another implementation, a contents display control apparatus includes: means for determining a media type of selected media contents; means for generating at least one adjustment value for at least one display parameter of the selected media contents; and means for controlling display of the selected media contents in the background when graphical user interface is present in the foreground, by appropriately adjusting the at least one display parameter of the selected media contents with the at least one adjustment value for the determined media type.

DETAILED DESCRIPTION

As used in this disclosure, the term "contents" can refer to multimedia contents including moving images, audio, and text. The term "media" can refer to means for carrying or transmitting information, such as hard disks, optical disks, memory cards, and broadcast lines, and can represent data formats such as compression formats.

This disclosure describes systems and methods that provide control of multimedia contents displayed in the background when the graphical user interface (GUI) is invoked in the foreground. The disclosure provides a plurality of implementations to enable context sensitive media display under the activated GUI menu screen. Furthermore, when the GUI menu screen is closed, the media display is allowed to continue from the previously "paused" state. In particular, various implementations of the contents display control systems and methods are described for multimedia apparatuses, such as game consoles and media controllers.

Figure 1:
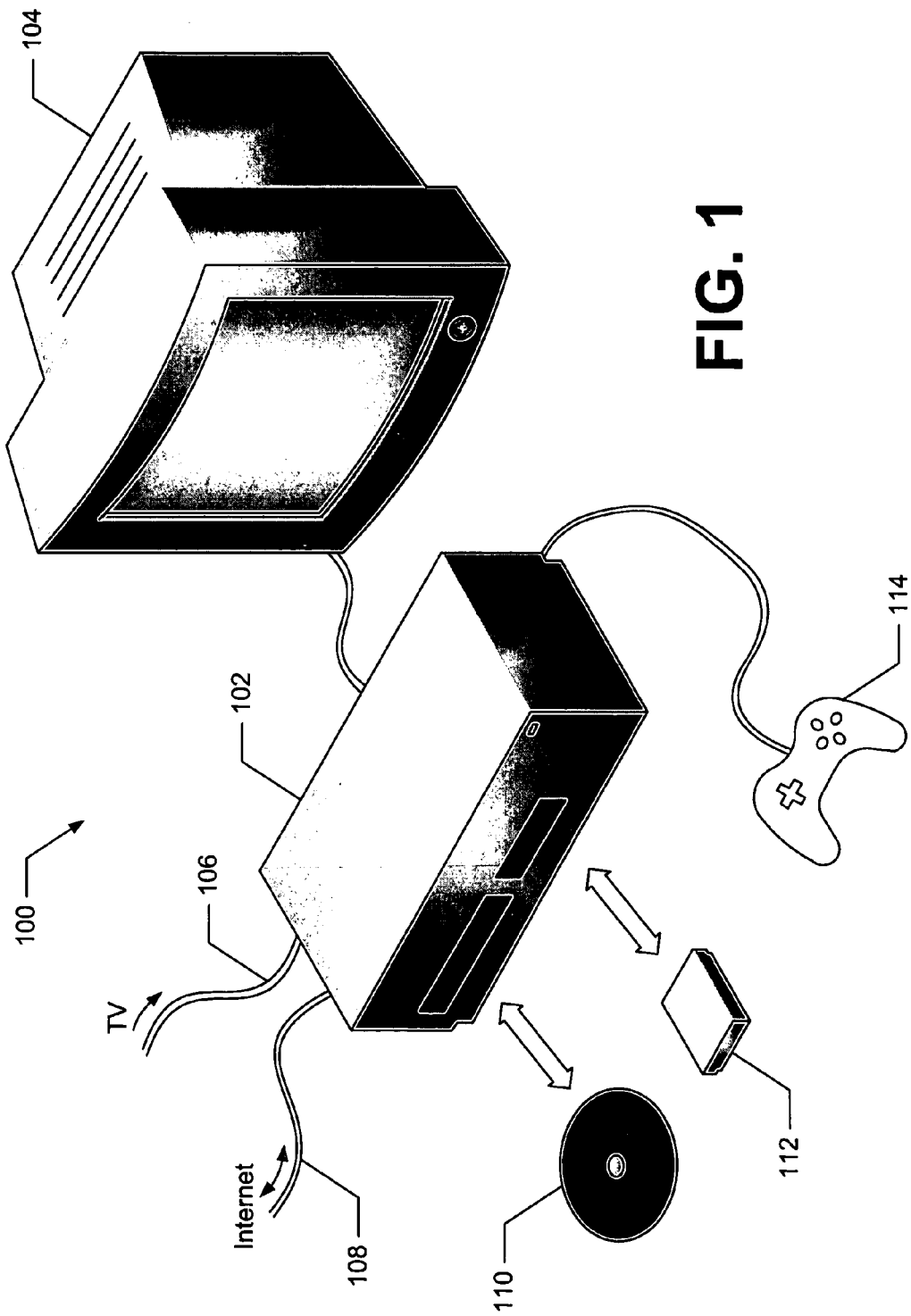
FIG. 1 shows one implementation of a multimedia processing system including a composite apparatus capable of processing a plurality of contents.

FIG. 1 shows one implementation of a multimedia processing system 100, which includes a composite apparatus capable of processing a plurality of contents, such as still images, moving images, music, broadcasts, and games, spread over a plurality of media. The processing of a plurality of contents includes presentation, recording, and other related tasks performed by the multimedia processing system 100. The multimedia processing system 100 includes a multimedia processing apparatus 102, a display 104 (e.g., a monitor or television), and a controller 114.

The multimedia processing apparatus 102 receives multimedia contents from various media sources, such as broadcast media, the Internet media, an optical disk 110, and a memory card 112. Contents from the broadcast media can be received through line 106, while contents from the Internet media can be received through line 108. The contents from the broadcast media and the Internet media can be recorded and stored by the multimedia processing apparatus 102. The received contents can also be used by various functions (e.g., a game) of the multimedia processing apparatus 102.

The received multimedia contents are displayed on the display 104. The controller 114 allows the user to input various instructions related to multimedia processing, and to control functions of the multimedia processing apparatus 102.

Figure 2:
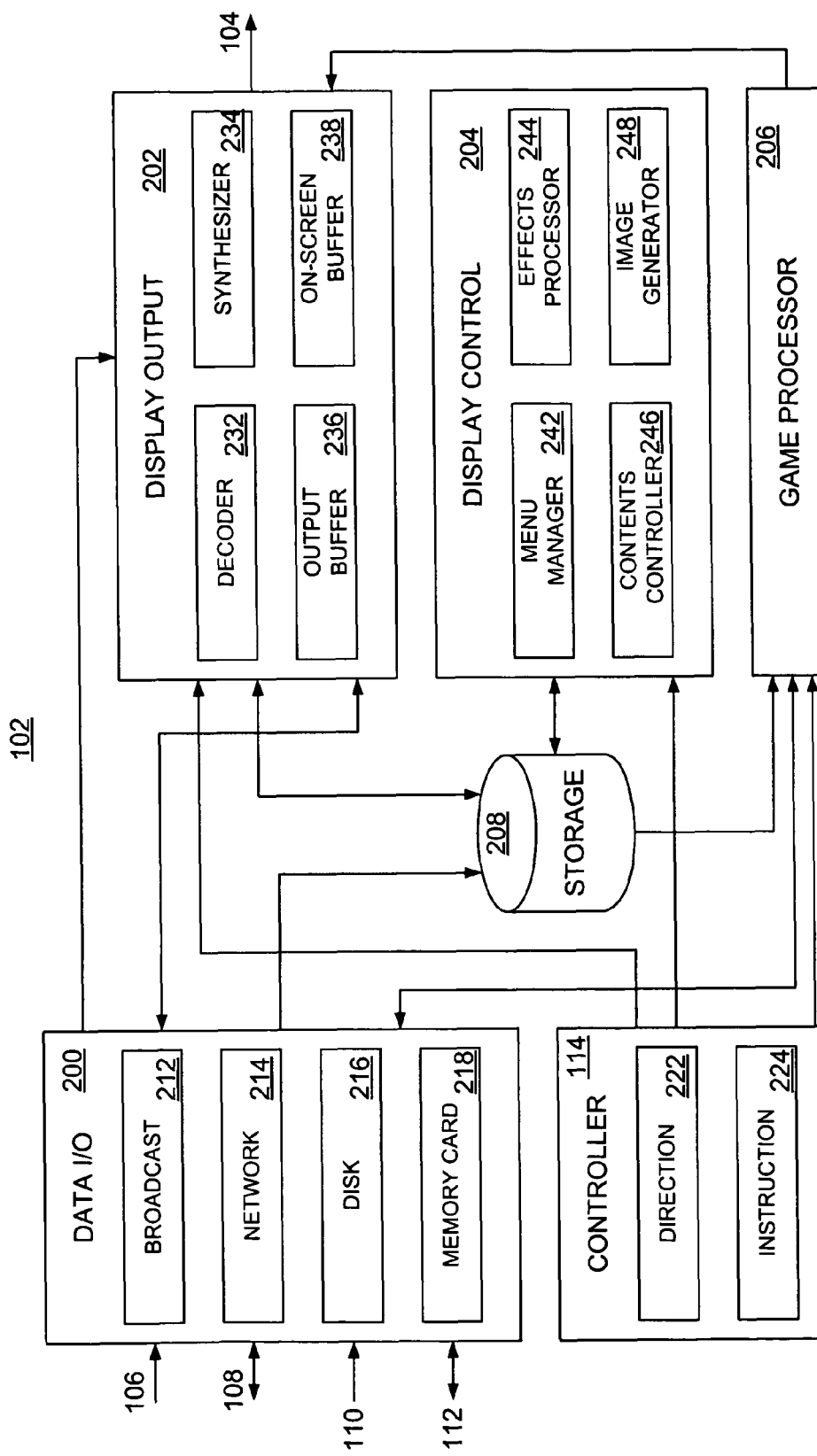
FIG. 2 is a functional block diagram showing one implementation of the multimedia processing apparatus.

FIG. 2 is a functional block diagram showing one implementation of the multimedia processing apparatus 102. In the illustrated implementation, the multimedia processing apparatus 102 includes the controller 114, a data input/output (I/O) unit 200, a display output unit 202, a display control unit 204, a storage unit 208, and a game processor 206. The multimedia processing apparatus 102 further includes programs and instructions for performing various functions, such as a data input function, a data retaining function, an image processing function, a rendering function, and other related functions.

The controller 114 includes a direction-determining unit 222 for determining one or a combination of four directions (i.e., an upward direction, a downward direction, a left direction, and a right direction) from the user input; and an instruction-determining unit 224 for determining an instruction from the user input. The instruction may include a command to present a multimedia content, to terminate the presentation, to invoke a menu screen, and to issue other related commands and/or instructions. Output of the controller 114 is directed to the display output unit 202, the display control unit 204, and the game processor 206.

In the illustrated implementations of FIGS. 1 and 2, the direction-determining unit 222 and the instruction-determining unit 224 are configured with a combination of buttons, circuits, and programs to actuate, sense, and determine the direction and the instruction. The buttons can include cross-shaped keys or joysticks. The button associated with an instruction for invoking a menu screen can be set in a toggle manner so that the menu screen can be toggled between a display mode and a non-display mode each time the button is pressed.

In one implementation, the direction-determining unit 222 may determine the diagonal movements of the button as a binary command in which the movement is ascertained to be in one of two directions. Thus, a diagonal movement between the up direction and the right direction can be ascertained to be in either the up or the right direction. In another implementation, the direction-determining unit 222 may determine the diagonal movements of the button as an analog command in which the movement is ascertained to be in a particular direction up to the accuracy of the measurement. Thus, a diagonal movement between the up direction and the right direction can be ascertained to be in a northwesterly direction.

The data I/O unit 200 includes a broadcast input unit 212 for inputting broadcast contents via the television line 106; a network communication unit 214 for inputting and outputting data such as web contents via the Internet line 108; a disk reading unit 216 for inputting data stored on a disk 110; and a memory card reading unit 218 for inputting and outputting data to/from a memory card 112. Output of the data I/O unit 200 is directed to the display output unit 202, the display control unit 204, the game processor 206, and the storage unit 208.

The display output unit 202 includes a decoder 232, a synthesizer 234, an output buffer 236, and an on-screen buffer 238. The decoder 232 decodes input data received from the data I/O unit 200 or the storage unit 208. Thus, the input data may include broadcast contents, movie, and music. The synthesizer 234 processes the decoded input data based on user direction/instruction received from the controller 114. The output of the synthesizer 234 is stored in the output buffer 236. The on-screen buffer 238 stores image data of the menu screen generated by the display control unit 204. The output of the display output unit 202 is transmitted to the display 104.

The display control unit 204 includes a menu manager 242, an effects processor 244, a contents controller 246, and an image generator 248. The menu manager 242 manages media items and multimedia contents received from the storage unit 208 and the data I/O unit 200, and shown on the menu screen. The effects processor 244 processes operation of icons and icon arrays on the menu screen. The effects processor 244 also manages various actions and effects to be displayed on the menu screen. The contents controller 246 controls processing of media items and multimedia contents, and handling of data from the data I/O unit, the storage unit 208, and the game processor 206. The image generator 248 operates to generate a menu screen including a medium icon array and a contents icon array.

The game processor 206 executes a game program using data read from the data I/O unit 200 or from the storage unit 208. The game processor 206 executes the game program based on user instructions received from the controller 114. The display data of the executed game program is transmitted to the display output unit 202.

Figure 3:
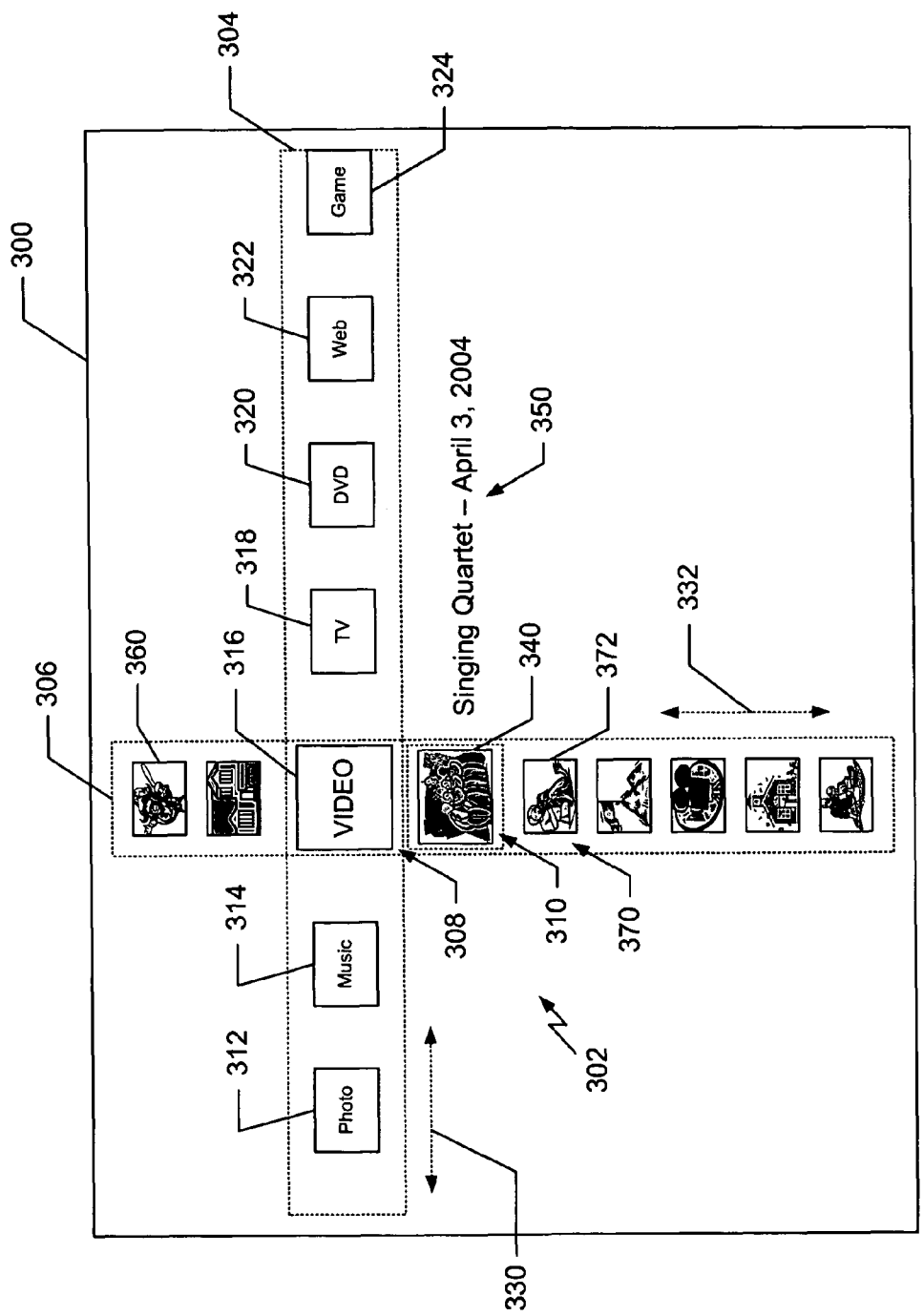
FIG. 3 illustrates a display of a menu screen generated by the multimedia processing apparatus.

FIG. 3 illustrates one implementation of a display 300 of a menu screen 302 generated by the multimedia processing apparatus 102. The display 300 illustrates the menu screen 302 in a two-dimensional array. In the illustrated implementation, the menu screen 302 is displayed as a cross shape. In other implementations, the menu screen can be displayed in any shape and in any number of dimensions.

The two-dimensional array includes a medium icon array 304 arranged in a horizontal direction, and a contents icon array 306 arranged in a vertical direction. In other implementations, the arrays 304, 306 can be arranged in different directions. Thus, the medium icon array 304 and the contents icon array 306 intersect near the center area 308 of the menu screen 302. The medium icon array 304 includes a plurality of medium icons. The contents icon array 306 includes a plurality of contents icons. The icons can be provide by the apparatus, selected by a user or retrieved from media.

In FIG. 3, the medium icon array 304 includes a photograph icon 312, a music icon 314, a moving image icon 316, a broadcast icon 318, an optical disk icon 320, a web icon 322, and a game icon 324. In other implementations, the medium icon array 304 can include other related icons, such as a streaming media icon or a network icon. These icons represent types of multimedia contents available for processing in the multimedia processing apparatus 102.

The medium icons 312-324 can be moved or scrolled across the menu screen 302 (e.g., see 330) by horizontally moving the button/joystick on the controller 114. A particular medium icon, for example, a video icon 316 in FIG. 3, can be selected by moving the icon 316 into the center area 308 of the menu screen 302. The medium icon 316 is enlarged when the icon 316 is moved into the center area 308 indicating the selection of a type of multimedia contents, which in this case is video. In another implementation, the selection can be made by moving the icon to an area other than the center area or by moving a pointer over the icon and clicking a button to select the icon. In a further implementation, the color of the selected medium icon can be changed to a color different from those of other medium icons in the medium icon array. In another implementation, the selected medium icon can be made to flash so that the selected icon can be easily distinguished from other icons.

The effects processor 244 in the display control unit 204 manipulates the medium icon array 304 in the menu screen 302 by scrolling the medium icons in a horizontal direction. Since the medium icons 312-324 in the medium icon array 304 are organized in a circular database, every medium icon in the medium icon array 304 can be selected and displayed by the effects processor 244 by continuously scrolling in one direction. For example, although the photo icon 312 is to the left of the center area 308 of the menu screen, the icon 312 can be moved into the center area 308 by continuously scrolling left. Alternatively, the medium icons can be arranged in a linear list.

As described above, the effects processor 244 displays the medium icons with the same display parameters while the icons are being scrolled. However, when a medium icon is moved into and fixed in the center area 308 of the menu screen 302, the effects processor 244 may change the display parameters for easy viewing. The display parameters can include color, size, brightness, saturation, and/or hue. The display parameters can also include special effects, such as a flashing or blinking action.

In FIG. 3, the video contents array is selected by moving the video icon 316 into the center area 308 of the menu screen 302. The selection of other medium icons displays contents icon arrays for other multimedia contents files. In FIG. 3, the selection triggers display of the video contents icon array 306, which includes thumbnail icons of video contents files stored in the storage unit 208. Thus, by moving a particular medium icon into or out of the center area 308, a full set of the multimedia contents icons relating to that particular medium icon can be fully extended or retracted.

Although FIG. 3 shows the video icon 316 as the selected icon, other medium icons 312-314, 318-324 can be selected to process/view other types of multimedia contents. For example, the photo icon 312 can be selected when a stored image is to be processed or viewed. Thus, the contents icon array may include thumbnail icons of still images or small moving images taken with a digital camera. The music icon 314 can be selected when audio files are played or processed. The audio files are typically read in from the optical disk 110 in a specific compression format. Thus, the contents icon array may include thumbnail icons of songs or albums. Information such as a title of the song or album can be displayed adjacent to the selected icon. Other attributes that can be displayed include the duration of the song or album.

The TV icon 318 can be selected when a television program received from the TV line 106 is to be viewed or processed. Thus, the contents icon array may include thumbnail icons of broadcast channels and/or programs. Attributes of the television program such as a name/number of the broadcast channel, a title of the program, and a broadcast time can be displayed. The DVD icon 320 can be selected when video and/or audio stored on the optical disk 110 is to be viewed and/or listened to. When the optical disk 110 is recognized as a DVD, a legend "DVD" is displayed on the medium icon 320. Otherwise, when the optical disk is recognized as a CD, a legend "CD" is displayed on the medium icon 320. In one implementation, when a moving image is stored on the DVD or the CD, a thumbnail of a short video clip can be used as a contents icon. In another implementation, when music is stored on the DVD or the CD, a short audio clip of the music can be used as a contents icon.

The Web icon 322 can be selected when data from the Internet line 108 is to be processed or displayed. Thus in this case, the contents icon array may include thumbnail icons of Web sites or links. Attributes of the Web sites such as a URL of the Web site can be displayed adjacent to the selected icon. The game icon 324 can be selected when a game program is to be played or executed. Thus in this case, the contents icon array may include thumbnail icons of different game programs. Attributes of the game program such as a title of the game can be displayed adjacent to the selected icon.

In general, the thumbnail contents icons are still images representing the linked multimedia contents files. However, the thumbnail icons can be a sequence of animated images, which may provide better representation of the contents files. In one implementation, the contents icons are retrieved from data of the contents files (e.g., from thumbnail data stored with the contents data).

In FIG. 3, when the video contents icon array 306 is in a fully extended mode, the array 306 includes eight visible video contents icons representing eight video contents files. In some implementations, the number of visible contents icons can be appropriately varied. Additional video contents icons representing other video contents files can be made visible by scrolling the icons up or down, as shown at 332. Similar to the medium icon processing, the effects processor 244 displays the video contents icons with the same display parameters while the icons are being scrolled. However, when a particular video contents icon 340 is positioned into an attention area 310, below the center area 308, the effects processor 244 changes the display parameters of the particular video contents icon 340 for easy viewing. In other implementations, the attention area 310 can be positioned at anywhere in the contents icon array 306.

The effects processor 244 enlarges the icon 340 when the icon is positioned into the attention area 310. The display parameters can include color, size, brightness, saturation, and/or hue. The display parameters can also include special effects, such as a flashing or blinking action. Further, when the video contents icon 340 is positioned into the attention area 310, attributes 350 associated with the icon 340 are displayed adjacent to the icon. For example, the attributes 350 can include a title and a recording date.

When the controller 114 provides a command/instruction to select a particular contents icon or thumbnail 340 (e.g., by entering a select or play command while the icon 340 is positioned in the attention area 310), the image generator 248 in the display control unit 204 removes the menu screen 302 from the display 300. Substantially simultaneously, the contents controller 246 in the display control unit 204 initiates the display of the contents file linked to the selected contents icon 340. In the illustrated implementation, the selected contents file is the Singing Quartet video.

Figure 4:
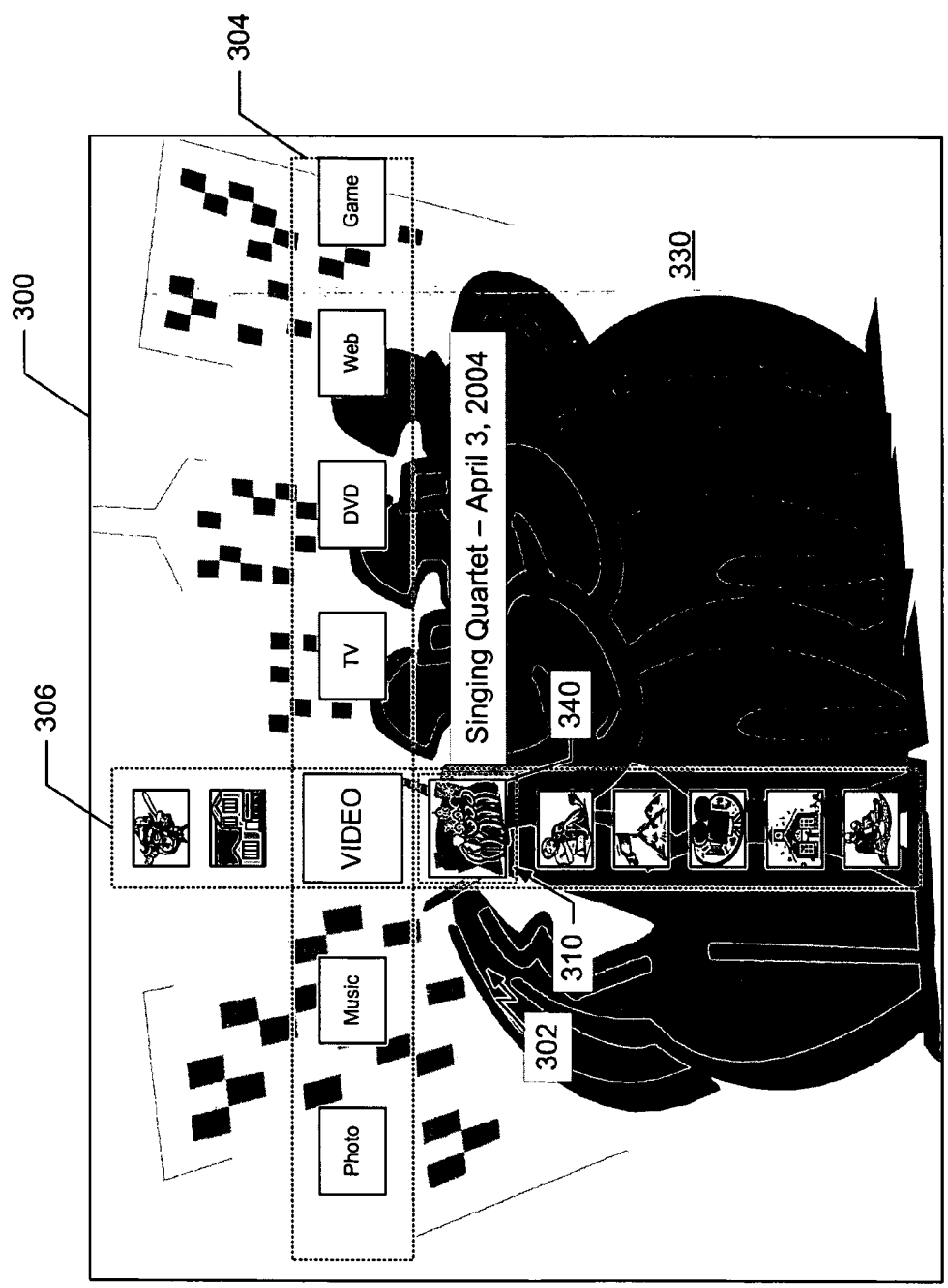
FIG. 4 shows the menu screen superimposed on top of the currently playing video associated with the video icon.

Once the selected video is playing, a command/instruction from the controller 114 to bring the menu screen 302 back up invokes the menu screen to be superimposed on top of the currently playing video, as shown in FIG. 4. The attention area 310 of the displayed menu screen 302 shows the video contents icon 340 of the currently playing video shown in the background 330.

Figure 5:
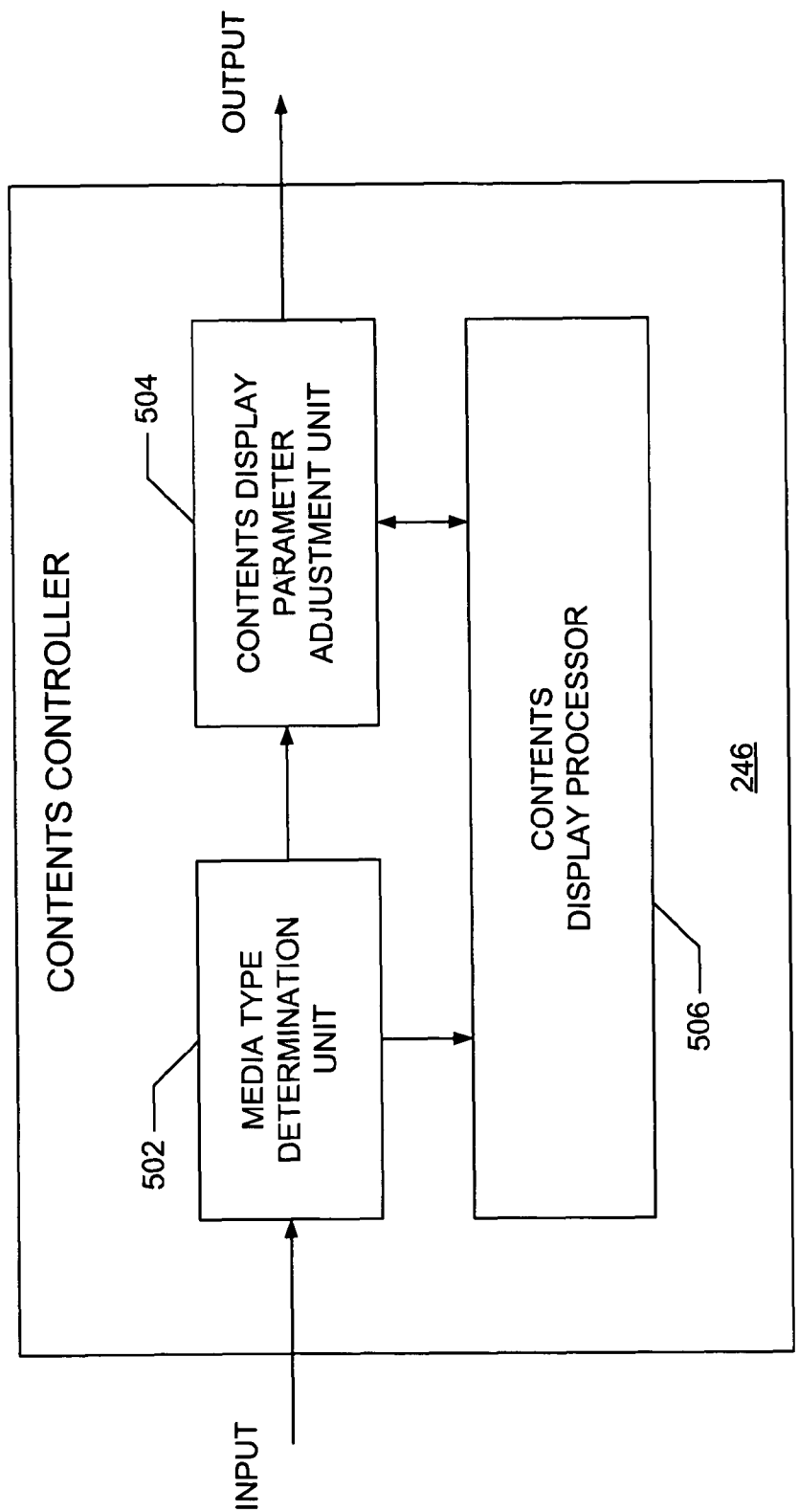
FIG. 5 is a detailed block diagram showing one implementation of the contents controller of the display control unit shown in FIG. 2.

FIG. 5 is a detailed block diagram showing one implementation of the contents controller 246 of the display control unit 204 shown in FIG. 2. The block diagram of the contents controller 246 shown in FIG. 5 only includes blocks configured to control the selected media contents displayed in the background when the GUI menu screen is invoked. Other functions of the contents controller 246 described above are not shown in FIG. 5. The contents controller 246 is configured to control the display of the background media contents according to the type of media contents.

The contents controller 246 includes a media type determination unit 502, a contents display parameter adjustment unit 504, and a contents display processor 506. The media type determination unit 502 receives an input and determines the media type of the media contents being displayed on the display 300. In one implementation, the input includes data indicating the media type. In this implementation, the media type determination unit 502 passes the received input data directly to the contents display parameter adjustment unit 504. In another implementation, the input includes data related to the media type. In this implementation, the media type determination unit 502 processes the received input data to determine the media type. The media type is then transmitted to the contents display parameter adjustment unit 504.

The contents display parameter adjustment unit 504 receives the media type from the media type determination unit 502 and operates to generate at least one adjustment value for at least one display parameter of the displayed media contents. The display parameters can include color, size, brightness, saturation, hue, and other related parameters, which may include the display speed for video. For example, in the illustrated implementation of FIG. 4, the brightness value is generated and used to dim the Singing Quartet video displayed in the background. In some implementations, an adjustment value for other display parameters can be generated to contrast the foreground GUI menu screen from the background media contents display. In other implementations, adjustment values for a plurality of display parameters may be generated.

In one implementation, the contents display parameter adjustment unit 504 is configured to display the video in full motion if the currently displayed media contents item is broadcast or streaming video. In another implementation, the contents display parameter adjustment unit 504 is configured to display the video in a freeze frame mode if the currently displayed media contents item is stored video such as video on DVD or video from a hard disk (e.g., DVR). In another implementation, the contents display parameter adjustment unit 504 is configured to display the music animation/graphics in slow motion if the currently displayed media contents item is music animation/graphics. In another implementation, if the currently displayed media contents item is a slide presentation, the contents display parameter adjustment unit 504 is configured to complete the last slide transition and display the last slide in still image.

The content display processor 506 receives the media type and the display adjustment parameter/value from the units 502 and 504, respectively. The contents display processor 506 operates to control unit 504 to appropriately adjust the media contents currently displayed in the background when the GUI menu screen is invoked to be displayed in the foreground.

Figure 6:
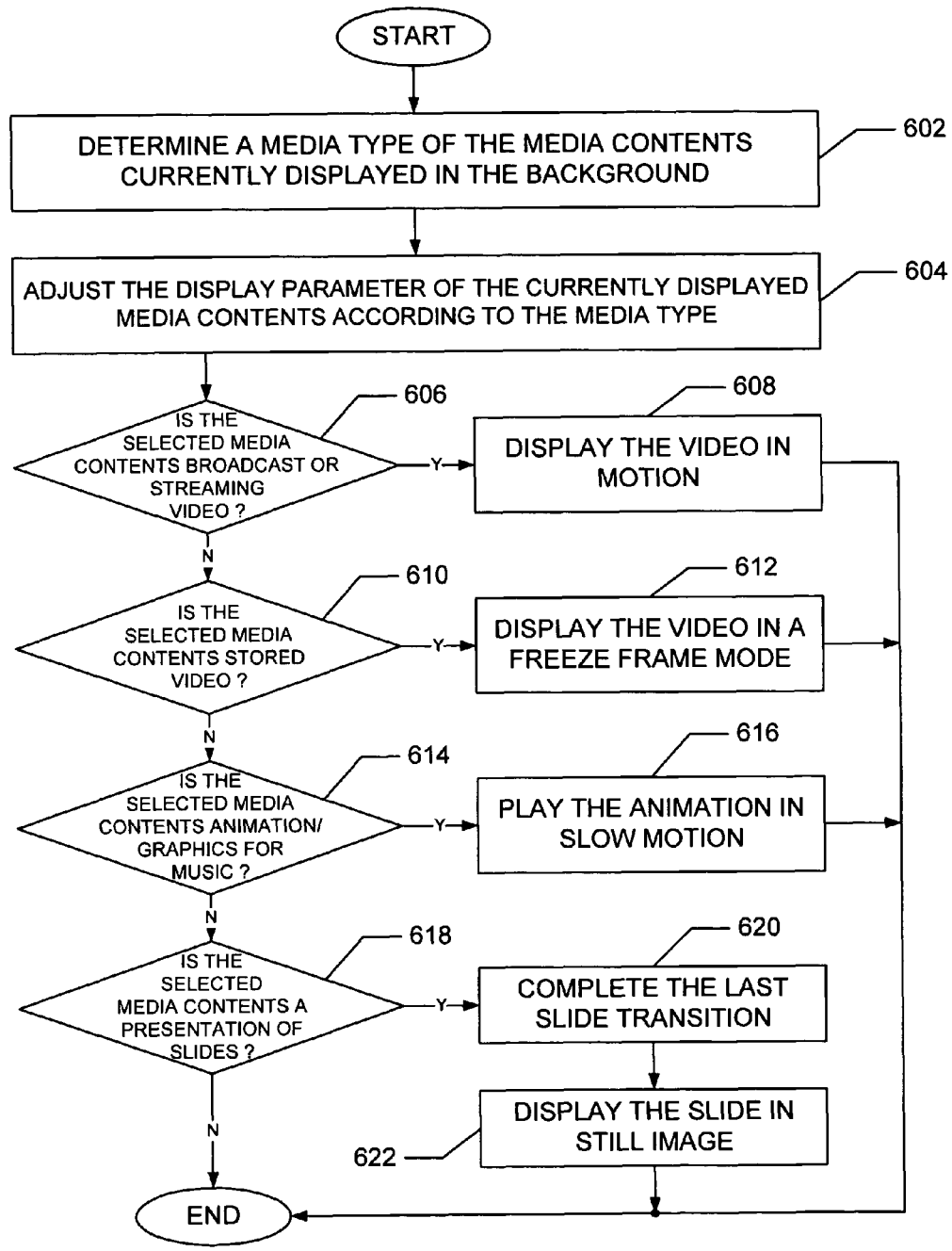
FIG. 6 is a flowchart illustrating a method for controlling media contents currently displayed in the background when the GUI menu screen is invoked to be displayed in the foreground.

FIG. 6 is a flowchart illustrating a method for controlling media contents currently displayed in the background when the GUI menu screen is invoked to be displayed in the foreground. The method includes determining a media type of the media contents currently displayed in the background, at 602. The display parameter(s) of the currently displayed media contents item is adjusted, at 604. In one implementation, the currently display media contents item is dimmed.

If the currently displayed media contents item is determined, at 606, to be broadcast or streaming video, then the video is displayed in full motion in the background, at 608. Otherwise, if the currently displayed media contents item is determined, at 610, to be stored video, then the video is displayed in a freeze frame mode in the background, at 612. Otherwise, if the currently displayed media contents item is determined, at 614, to be music animation/graphics, then the animation/graphics is played in slow motion in the background, at 616. Otherwise, if the currently displayed media contents item is determined, at 618, to be a slide presentation, then the last slide transition is completed, at 620. The last slide is then displayed in still image, at 622.

In other implementations, more, fewer, or different display adjustments are available, such as adding text to the screen (e.g., "PAUSE") or resizing the displayed contents to match a portion of the screen not obscured by the menu. When the menu screen is no longer displayed (e.g., through an exit command), the contents are returned to their former mode of display.

Various implementations of the invention are realized in electronic hardware, computer software, or combinations of these technologies. Most implementations include one or more computer programs executed by a programmable computer. For example, in one implementation, the system for control of selected multimedia contents displayed in the background while the graphical user interface (GUI) is present in the foreground includes one or more computers executing software implementing the control of selected multimedia contents displayed in the background as discussed above. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Although various illustrative implementations of the present invention have been described, one of ordinary skill in the art will see that additional implementations are also possible and within the scope of the present invention. For example, while the contents controller 246 shown in FIG. 5 is implemented for controlling the display parameter(s) of the selected media contents displayed in the background, the implementation of the contents controller 246 is equally applicable to controlling the display parameter(s) of the GUI menu screen display in the foreground while the selected media contents is being displayed in the background.

Accordingly, the present invention is not limited to only those implementations described above.

What is claimed is:

1. A contents display control system for controlling the display of media contents derived from a medium selected from plural media types, comprising:

a media type determination unit configured to determine the media type from which currently displayed media contents are derived;

a contents display parameter adjustment unit operating to generate at least one adjustment value for at least one display parameter of the currently displayed media contents as a function of the determined media type; and a contents display processor configured to display, as background, the currently displayed media contents and to operatively control the at least one display parameter of the currently displayed media contents in said background when a graphical user interface is invoked to be displayed concurrently in the foreground of the display such that a display characteristic of the currently displayed media contents in said background is changed when said graphical user interface is invoked, wherein the currently displayed media content is selected from a plurality of media content using the graphical user interface, wherein the selection comprises:

scrolling icons, each icon representing a different source of multimedia content, in a horizontal direction;

selecting the type of multimedia content;

scrolling contents files in a vertical direction; and selecting the contents file, wherein the display characteristic of the currently displayed media contents in said background is changed as a function of at least one adjustment value generated to contrast the currently displayed media contents in said background from a currently displayed icon on the graphical user interface, wherein, when the graphical user interface is invoked, the currently displayed media contents are resized to match a portion of the screen not obscured by the graphical user interface, and wherein the display characteristic of the currently displayed media contents in said background that was changed as a function of the at least one adjustment value generated to contrast the currently displayed media contents is changed back when said graphical user interface is exited.

2. The contents display control system of claim 1, wherein the at least one display parameter includes brightness.

3. The contents display control system of claim 2, wherein the at least one adjustment value includes a value for the brightness to operatively dim the display of the currently displayed media contents in said background.

4. The contents display control system of claim 1, wherein the at least one display parameter includes color.

5. The contents display control system of claim 1, wherein the at least one display parameter includes size.

6. The contents display control system of claim 1, wherein the at least one display parameter includes hue.

7. The contents display control system of claim 1, wherein the content display control system is implemented in a multimedia processing apparatus.

8. The contents display control system of claim 1, wherein the media type includes photograph.

9. The contents display control system of claim 1, wherein the media type includes music.

10. The contents display control system of claim 1, wherein the media type includes video.

11. The contents display control system of claim 1, wherein the media type includes broadcast.

12. The contents display control system of claim 1, wherein the media type includes web.

13. The contents display control system of claim 1, wherein the media type includes optical disks.

14. A contents display control method for controlling the display of media contents derived from a medium selected from plural media types, said method comprising:

determining the media type from which currently displayed media contents are derived;

generating at least one adjustment value for at least one display parameter of the currently displayed media contents as a function of the determined media type;

displaying as background the currently displayed media contents, wherein the currently displayed media content is selected from a plurality of media content using the graphical user interface, wherein the selection comprises:

scrolling icons, each icon representing a different source of multimedia content, in a horizontal direction;

selecting the type of multimedia content;

scrolling contents files in a vertical direction; and selecting the contents file; and controlling the at least one display parameter of the currently displayed media contents in said background when a graphical user interface is invoked to be displayed concurrently in the foreground of the display such that a display characteristic of the currently displayed media contents in said background is changed when said graphical user interface is invoked, wherein the display characteristic of the currently displayed media contents in said background is changed as a function of at least one adjustment value generated to contrast the currently displayed media contents in said background from a currently displayed icon on the graphical user interface, wherein, when the graphical user interface is invoked, the currently displayed media contents are resized to match a portion of the screen not obscured by the graphical user interface, and wherein the display characteristic of the currently displayed media contents in said background that was changed as a function of the at least one adjustment value generated to contrast the currently displayed media contents is changed back when said graphical user interface is exited.

15. The method of claim 14, wherein determining a media type includes determining the media type of currently displayed media contents as broadcast or streaming video.

16. The method of claim 15, wherein controlling the at least one display parameter of the currently displayed media contents includes displaying the video in full motion.

17. The method of claim 14, wherein determining a media type includes determining the media type of currently displayed media contents as stored video.

18. The method of claim 17, wherein controlling the at least one display parameter of the currently displayed media contents includes displaying the video in a freeze frame mode.

19. The method of claim 14, wherein determining a media type includes determining the media type of currently displayed media contents as music animation or graphics.

20. The method of claim 19, wherein controlling the at least one display parameter of the currently displayed media contents includes displaying the music animation or graphics in slow motion.

21. The method of claim 14, wherein determining a media type includes determining the media type of currently displayed media contents as a slide presentation.

22. The method of claim 21, wherein controlling the at least one display parameter of the currently displayed media contents includes completing a last slide transition.

23. The method of claim 22, wherein controlling the at least one display parameter of the currently displayed media contents further includes displaying the last slide in still image.

24. A non-transitory computer readable medium storing a computer program for use in controlling the display of media contents derived from a medium selected from plural media types, the program comprising executable instructions that cause a computer to:
determine the media type from which currently displayed media contents are derived;
generate at least one adjustment value for at least one display parameter of the currently displayed media contents as a function of the determined media type;
display as background the currently displayed media contents,
wherein the currently displayed media content is selected from a plurality of media content using the graphical user interface,
wherein the selection comprises:
scrolling icons, each icon representing a different source of multimedia content, in a horizontal direction;
selecting the type of multimedia content;
scrolling contents files in a vertical direction; and
selecting the contents file; and
control the at least one display parameter of the currently displayed media contents in said background when a graphical user interface is invoked to be displayed concurrently in the foreground of the display such that a display characteristic of the currently displayed media contents in said background is changed when said graphical user interface is invoked,
wherein the display characteristic of the currently displayed media contents in said background is changed as a function of at least one adjustment value generated to contrast the currently displayed media contents in said background from a currently displayed icon on the graphical user interface,
wherein, when the graphical user interface is invoked, the currently displayed media contents are resized to match a portion of the screen not obscured by the graphical user interface, and
wherein the display characteristic of the currently displayed media contents in said background that was changed as a function of the at least one adjustment value generated to contrast the currently displayed media contents is changed back when said graphical user interface is exited.

25. The computer readable medium of claim 24, wherein executable instructions that cause a computer to determine a media type includes executable instructions that cause a computer to
determine the media type of currently displayed media contents as broadcast or streaming video.

26. The computer readable medium of claim 25, wherein executable instructions that cause a computer to control the at least one display parameter of the currently displayed media contents includes executable instructions that cause a computer to
display the video in full motion.

27. The computer readable medium of claim 24, wherein executable instructions that cause a computer to determine a media type includes executable instructions that cause a computer to
determine the media type of currently displayed media contents as stored video.

28. The computer readable medium of claim 27, wherein executable instructions that cause a computer to control the at least one display parameter of the currently displayed media contents includes executable instructions that cause a computer to
display the video in a freeze frame mode.

29. The computer readable medium of claim 24, wherein executable instructions that cause a computer to determine a media type includes executable instructions that cause a computer to
determine the media type of currently displayed media contents as music animation or graphics.

30. The computer readable medium of claim 29, wherein executable instructions that cause a computer to control the at least one display parameter of the currently displayed media contents includes executable instructions that cause a computer to
display the music animation or graphics in slow motion.

31. The computer readable medium of claim 24, wherein executable instructions that cause a computer to determine a media type includes executable instructions that cause a computer to
determine the media type of currently displayed media contents as a slide presentation.

32. The computer readable medium of claim 31, wherein executable instructions that cause a computer to control the at least one display parameter of the currently displayed media contents includes executable instructions that cause a computer to
complete a last slide transition.

33. The computer readable medium of claim 32, wherein executable instructions that cause a computer to control the at least one display parameter of the currently displayed media contents includes executable instructions that cause a computer to
display the last slide in still image.

34. A graphical user interface accessible to a user suitable for receiving user-supplied inputs that facilitate selecting a multimedia icon, comprising:
a medium icon array arranged in a first direction, and including a plurality of user selectable medium icons representing different media from which media contents are derived;
a contents icon array arranged in a second direction, and including a plurality of user selectable contents icons representing the contents on a selected medium; and
media contents arranged to be executed in the background of the graphical user interface, wherein at least one display parameter of the media contents displayed in the background is adjusted as a function of the media type from which the media contents are derived, when the medium icon array and the contents icon array are displayed in the foreground of the graphical user interface,
wherein the currently displayed media content is selected from a plurality of media content using the graphical user interface,
wherein the selection comprises:
scrolling icons, each icon representing a different source of multimedia content, in a horizontal direction;
selecting the type of multimedia content;
scrolling contents files in a vertical direction; and
selecting the contents file,
wherein a display characteristic of currently displayed media contents in said background is changed as a function of at least one adjustment value generated to contrast the currently displayed media contents in said background from the medium icon array and the contents icon array displayed in the foreground of the graphical user interface, wherein, when the graphical user interface is invoked, the currently displayed media contents are resized to match a portion of the screen not obscured by the graphical user interface, and wherein the display characteristic of the currently displayed media contents in said background that was changed as a function of the at least one adjustment value generated to contrast the currently displayed media contents is changed back when said graphical user interface is exited.

35. The graphical user interface of claim 34, wherein the medium icon array and the contents icon array are configured in a cross shape with an intersecting area.

36. A contents display control apparatus for controlling the display of media contents derived from a medium selected from plural media types, comprising:

means for determining the media type from which currently displayed media contents are derived;

means for generating at least one adjustment value for at least one display parameter of the currently displayed media contents as a function of the determined media type;

means for displaying the currently displayed media contents as background, wherein the currently displayed media content is selected from a plurality of media content using the graphical user interface, wherein the selection comprises:

scrolling icons, each icon representing a type-different source of multimedia content, in a horizontal direction;

selecting the type of multimedia content;

scrolling contents files in a vertical direction; and selecting the contents file; and means for controlling the at least one display parameter of the currently displayed media contents in said background when a graphical user interface is invoked to be displayed concurrently in the foreground of the display such that a display characteristic of the currently displayed media contents in said background is changed when said graphical user interface is invoked, wherein the display characteristic of currently displayed media contents in said background is changed as a function of at least one adjustment value generated to contrast the currently displayed media contents in said background from a currently displayed icon on the graphical user interface, wherein, when the graphical user interface is invoked, the currently displayed media contents are resized to match a portion of the screen not obscured by the graphical user interface, and wherein the display characteristic of the currently displayed media contents in said background that was changed as a function of the at least one adjustment value generated to contrast the currently displayed media contents is changed back when said graphical user interface is exited.

* * * * *